US012756251B2

(12) United States Patent
Cesa et al.

(10) Patent No.: US 12,756,251 B2
(45) Date of Patent: Oct. 6, 2026

(54) ROTOR APPARATUS FOR AN ELECTRIC MACHINE

(71) Applicant: JAGUAR LAND ROVER LIMITED, Whitley (GB)

(72) Inventors: Tiago Cesa, Whitley (GB); Muhammed Fasil Palakkunnu Veettil, Whitley (GB); Istvan Kiraly, Whitley (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 251 days.

(21) Appl. No.: 18/251,680

(22) PCT Filed: Nov. 3, 2021

(86) PCT No.: PCT/EP2021/080549
§ 371 (c)(1),
(2) Date: May 3, 2023

(87) PCT Pub. No.: WO2022/096528
PCT Pub. Date: May 12, 2022

(65) Prior Publication Data

US 2024/0014702 A1 Jan. 11, 2024

(30) Foreign Application Priority Data

Nov. 3, 2020 (GB) ..................................... 2017417

(51) Int. Cl.
*H02K 1/276* (2022.01)
*H02K 21/14* (2006.01)

(52) U.S. Cl.
CPC ........... *H02K 1/2766* (2013.01); *H02K 21/14* (2013.01)

(58) Field of Classification Search
CPC .... H02K 1/2766; H02K 1/2753; H02K 1/276; H02K 1/274; H02K 1/272; H02K 1/2706; H02K 1/27
See application file for complete search history.

(56) References Cited

U.S. PATENT DOCUMENTS

| | | | | |
|---|---|---|---|---|
| 10,476,326 B2 * | 11/2019 | Heo | ........................ | H02K 21/14 |
| 10,978,923 B2 * | 4/2021 | Yabe | ........................ | F04D 13/06 |

(Continued)

FOREIGN PATENT DOCUMENTS

| | | |
|---|---|---|
| CN | 111769668 A | 10/2020 |
| EP | 2916435 A1 | 9/2015 |

(Continued)

OTHER PUBLICATIONS

WO-2019215853-A1 translation (Year: 2019).*
(Continued)

*Primary Examiner* — Oluseye Iwarere
*Assistant Examiner* — Nicholas Lee Setzer
(74) *Attorney, Agent, or Firm* — McCoy Russell LLP

(57) ABSTRACT

The present disclosure relates to a rotor for an electric machine. The rotor has a plurality of rotor poles each having at least one aperture. The at least one aperture includes a chamber for receiving a magnet; and at least one flux barrier for controlling the path through which magnetic flux flows in the rotor. The rotor poles each have at least one flux guide for guiding magnetic flux across the at least one flux barrier during a demagnetization event. The flux guide(s) form a constriction between the magnet receiving chamber and the flux barrier. The present disclosure also relates to an electric machine comprising a rotor; and a vehicle comprising an electric machine.

11 Claims, 9 Drawing Sheets

(56) References Cited

U.S. PATENT DOCUMENTS

| | | | | |
|---|---|---|---|---|
| 11,424,649 | B2 * | 8/2022 | Schulde | H02K 1/276 |
| 2015/0137650 | A1 * | 5/2015 | Takahashi | H02K 1/32 310/156.56 |
| 2015/0256038 | A1 * | 9/2015 | Nigo | F25B 31/026 310/156.57 |
| 2016/0028278 | A1 | 1/2016 | Baba et al. | |
| 2019/0165627 | A1 * | 5/2019 | Michaelides | H02K 1/278 |
| 2019/0199150 | A1 * | 6/2019 | Cesa | H02K 21/14 |
| 2021/0006108 | A1 * | 1/2021 | Dong | H02K 1/276 |
| 2021/0296949 | A1 * | 9/2021 | Liu | H02K 1/276 |
| 2022/0014057 | A1 * | 1/2022 | Zou | H02K 1/2766 |
| 2023/0253841 | A1 * | 8/2023 | Kiraly | H02K 1/2766 310/156.56 |

FOREIGN PATENT DOCUMENTS

| | | | | |
|---|---|---|---|---|
| GB | 2559233 | A | 8/2018 | |
| JP | 2014155242 | A | 8/2014 | |
| JP | 2015097437 | A | 5/2015 | |
| JP | 2016220412 | A | 12/2016 | |
| JP | 2017028923 | A | 2/2017 | |
| JP | 2018011466 | A | 1/2018 | |
| WO | WO-2019215853 | A1 * | 11/2019 | H02K 1/27 |

OTHER PUBLICATIONS

Korean Intellectual Property Office, Office Action Issued in Application No. 10-2023-7018408, Sep. 25, 2024, 22 pages.

Great Britain Intellectual Property Office, Combined Search and Examination Report under Section 17 and 18(3) Issued in Application No. GB2017417.3, Aug. 17, 2021, 9 pages.

ISA European Patent Office, International Search Report and Written Opinion Issued in Application No. PCT/EP2021/080549, Feb. 28, 2022, WIPO, 16 pages.

European Patent Office, Office Action Issued in Application No. 21806197.6, May 26, 2025, Netherlands, 7 pages.

* cited by examiner

ROTOR APPARATUS FOR AN ELECTRIC MACHINE

CROSS REFERENCE TO RELATED APPLICATIONS

The present application is a U.S. National Phase of International Application No. PCT/EP2021/080549 entitled "ROTOR APPARATUS FOR AN ELECTRIC MACHINE," and filed on Nov. 3, 2021. International Application No. PCT/EP2021/080549 claims priority to Great Britain Patent Application No. 2017417.3 filed on Nov. 3, 2020. The entire contents of each of the above-listed applications are hereby incorporated by reference for all purposes.

TECHNICAL FIELD

The present disclosure relates to a rotor apparatus for an electric machine. More particularly, but not exclusively, the present disclosure relates to a rotor for an electric machine.

BACKGROUND

The electrical drive systems in vehicles frequently use electric machines in the form of a motor having permanent magnets (Permanent Magnet Synchronous Machines—PMSM). These electrical machines may be used in electrical automobiles, including battery electric vehicles (BEV), hybrid electric vehicles (HEV), plug-in hybrid electric vehicles (PHEV)). The electrical machines offer high peak torque and power capability despite their simple and robust mechanical constructions. Beside the simplicity of construction, significantly less heat is generated in the rotating part (i.e. the rotor) of the machine compared to the induction machines where in the rotor conductors the generated heat is in the range of the heat generated in the stator conductors.

Electric machines comprising permanent magnets may suffer from a demagnetisation event which may adversely affect the permanent magnets. The demagnetisation event may occur in a fault condition, such as a transient short circuit event. The demagnetisation event may occur if the electric machine deviates too far out of normal operating regimes/conditions (usually failure regimes which generate much higher current). The demagnetisation event may partially demagnetise the permanent magnets, potentially affecting performance.

At least in certain embodiments, the present invention seeks to address some of the problems associated with prior art apparatus.

SUMMARY OF THE INVENTION

Aspects of the present invention relate to a rotor, a rotor assembly and an electric machine as claimed in the appended claims.

According to an aspect of the present invention there is provided a rotor for an electric machine, the rotor comprising: a plurality of rotor poles, the rotor poles each comprising: at least one aperture comprising: a chamber for receiving a magnet; and at least one flux barrier for controlling the path through which magnetic flux flows in the rotor.

The rotor poles may each comprise at least one flux guide for guiding magnetic flux across the at least one flux barrier during a demagnetization event.

The at least one flux guide may provide an alternative path (or paths) for flux during a demagnetization event (such as a fault condition) where the level of demagnetising flux may otherwise magnetically damage one or more permanent magnet provided in the rotor assembly.

The or each flux guide may form a constriction between the magnet receiving chamber and the flux barrier. The constriction may reduce a distance across a proximal end of the flux barrier (i.e. the end closest to the chamber for receiving the magnet), thereby creating a path for the demagnetizing flux. The distance between a distal end of the or each flux guide and an opposing surface of the flux barrier may be reduced (for example, in adjacent sections of the flux barrier) to create the path for the demagnetizing flux.

At least in certain embodiments, the or each constriction comprises or consists of a localized feature, for example forming a waisted section of the aperture disposed between the chamber and the flux barrier. The aperture may expand (open outwardly) on one or both sides of the constriction. The constriction typically has a span which is less than that of adjacent regions disposed to one or both sides. At least in certain embodiments, the constriction provides a pathway for the magnetic flux across the flux barrier during a demagnetization event. The constriction may be spaced apart from an end of the chamber for receiving the magnet. At least in certain embodiments, the resulting magnetic pathway does not traverse the magnet (i.e. is distinct from or separated from the chamber for receiving the magnet). Thus, during the demagnetization event, at least some of the magnetic flux may bypass or circumvent the magnet, thereby reducing or preventing demagnetization.

The or each flux guide may provide alternative magnetic paths for the armature reaction flux during a demagnetisation event. The or each flux guide may form a region which is magnetically shadowed (or shielded). The or each magnetically shadowed region may help to protect the permanent magnet during a demagnetization event. The or each flux guide may be positioned to provide protection for one or more region of the permanent magnet which may be affected by demagnetisation. For example, the or each flux guide may be positioned to provide protection for one or more corner of the permanent magnet. These magnetically shadowed regions may reduce the magnetic field strength (H) in the permanent magnet that is opposite to the original magnetization direction by providing alternative magnetic paths for the armature reaction flux during the demagnetisation event.

The flux guides form flux channels through the rotor which may provide one or more alternative path for flux during a demagnetisation event. The one or more flux barrier may also influence the flux channels formed in rotor. At least in certain embodiments, performance of the electric machine may be substantially unaffected by the at least one flux guide in the rotor.

The or each flux guide may comprise a projection extending partway across the aperture.

The or each flux guide may be disposed between the chamber and the at least one flux barrier.

The at least one flux barrier may comprise a central axis. The central axis may be curvilinear. The central axis may have an angular extent greater than or equal to 135°. The angular extent of the central axis may be less than or equal to 2250 The central axis may have an angular extent of approximately 180°. The resulting flux barrier may comprise a curved profile. For example, the flux barrier may be part-annular. The flux barrier may be generally C-shaped. The angular extent of the flux barrier may be measured with respect to a longitudinal centreline of the chamber.

The flux barrier comprises a first (proximal) end and a second (distal) end. The first end of the flux barrier may be open to the chamber. The second end of the flux barrier may be closed. The second end of the flux barrier being radially offset from the chamber. The second end of the flux barrier may partially overlap the chamber. The flux barrier may be configured to overlap a portion of an end of a magnet disposed in the chamber in the assembled rotor.

The or each flux guide may be configured such that the constriction has a span which is smallest in a direction substantially perpendicular to a central longitudinal axis of the chamber.

The central longitudinal axis of the chamber may correspond to the longitudinal axis of the magnet.

A span of the constriction may be defined relative to the dimension of the chamber for receiving the magnet (or the magnets). In a direction perpendicular to the central longitudinal axis of the chamber, the constriction may have a span which is less than or equal to 50%, 60%, 70%, or 75% of the corresponding dimension of the chamber.

The flux guide may extend in a direction perpendicular to the central longitudinal axis of the chamber. The extent of the flux guide in this direction may be greater than or equal to 25%, 30%, 40% or 50% of the height of the third magnet chamber.

Each rotor pole may comprise a plurality of the flux guides.

A first of the least one flux guide may be disposed on a first side of the aperture proximal to a circumference of the rotor. The first one of the at least one flux guide may be disposed on a radially outer side of the aperture. A second one of the at least one flux guide may be disposed on a second side of the aperture distal from a circumference of the rotor. The second one of the at least one flux guide may be disposed on a radially inner side of the aperture. The first and second flux guides may oppose each other to form the constriction.

One of the at least one flux guide may be associated with each flux barrier.

The at least one aperture may comprise at least one aperture expansion. The or each aperture expansion may, for example, comprise or consist of a localized expanded region. The at least one aperture expansion may be formed opposite to the at least one flux guide. The aperture expansion may reduce magnetic flux in a localized region. The aperture expansion may, for example, be formed at or proximal to a region of the chamber associated with a corner of the magnet. The at least one aperture expansion may reduce magnetic permeability across the corner of the magnet, thereby reducing the magnetic flux across the magnet during a demagnetization event.

The aperture expansion and the flux guide may be arranged in opposition to each other. The aperture expansion may be formed opposite to the flux guide in a direction substantially perpendicular to the transverse axis of the magnet receiving chamber. The aperture expansion may comprise a concave region. In the rotor assembly, the at least one aperture expansion may be disposed proximate to a corner of the magnet mounted in the chamber. The localized expansion may extend away from a transverse axis beyond the associated face of the magnet. The aperture expansion may increase the effective span of the aperture in the region proximal to an end of the magnet.

A first one of the at least one flux barrier may be disposed at a first end of the at least one aperture. A second one of the at least one flux barrier may be disposed at a second end of the at least one aperture.

The at least one flux barrier may extend towards an outer circumference of the rotor.

According to a further aspect of the present invention there is provided a rotor for an electric machine, the rotor comprising: a plurality of rotor poles, the rotor poles each comprising: at least one aperture comprising: a chamber for receiving a magnet; and at least one flux barrier for controlling magnetic flux in the rotor; wherein the at least one flux barrier comprises a central axis, the central axis being curved and having an angular extent greater than or equal to 135°.

The resulting flux barrier may comprise a curved profile. For example, the flux barrier may be part-annular. The flux barrier may be generally C-shaped. The angular extent of the central axis may be less than or equal to 225° The angular extent of the central axis may be approximately 180°

The flux barrier having a first end and a second end. The first end of the flux barrier is open to the chamber. The second end of the flux barrier may be closed. The second end of the flux barrier being radially offset from the chamber. The second end of the flux barrier may partially overlap the chamber. A magnet is disposed in the chamber in the rotor assembly. The second end of the flux barrier may partially overlap the magnet.

According to a further aspect of the present invention there is provided a rotor assembly comprising a rotor as claimed in any one of the preceding claims. The rotor assembly may comprise a plurality of magnets disposed in the chambers in the rotor. Each magnet may have a unitary composition, i.e. consisting of a single magnet. Alternatively, one or more of the magnets may be segmented. The segmented magnets may comprise a plurality of magnet segments disposed in the or each chamber formed in the rotor.

According to a still further aspect of the present invention there is provided an electric machine comprise a rotor assembly as described herein.

According to a yet further aspect of the present invention there is provided a vehicle comprising an electric machine as described herein.

Any control unit or controller described herein may suitably comprise a computational device having one or more electronic processors. The system may comprise a single control unit or electronic controller or alternatively different functions of the controller may be embodied in, or hosted in, different control units or controllers. As used herein the term “controller” or “control unit” will be understood to include both a single control unit or controller and a plurality of control units or controllers collectively operating to provide any stated control functionality. To configure a controller or control unit, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. The control unit or controller may be implemented in software run on one or more processors. One or more other control unit or controller may be implemented in software run on one or more processors, optionally the same one or more processors as the first controller. Other suitable arrangements may also be used.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present invention will now be described, by way of example only, with reference to the accompanying figures, in which.

DETAILED DESCRIPTION

Figure 1:
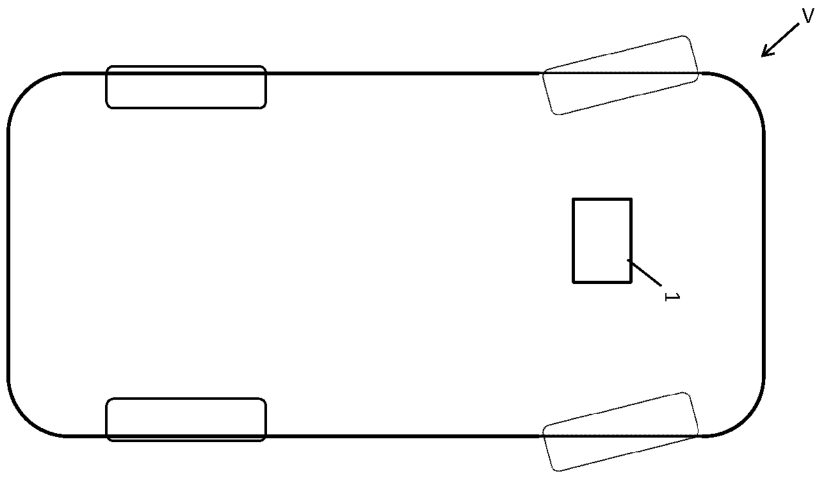
FIG. 1 shows a vehicle incorporating an electric machine in accordance with an embodiment of the present invention.

An electrical machine 1 in accordance with an embodiment of the present invention is described herein with reference to the accompanying Figures. As illustrated in FIG. 1, the electrical machine 1 has particular application as an electric drive unit (EDU) in a vehicle V, such as an automobile, a utility vehicle or a tractor unit. In use, the EDU generates a force to propel the vehicle V. The EDU may be used independently, for example in a battery electric vehicle (BEV) application; or in conjunction with an internal combustion engine (not shown), for example in a hybrid electric vehicle (HEV) application or a plug-in hybrid electric vehicle (PHEV) application. It will be understood that the electrical machine 1 may be used in other applications.

Figure 2:
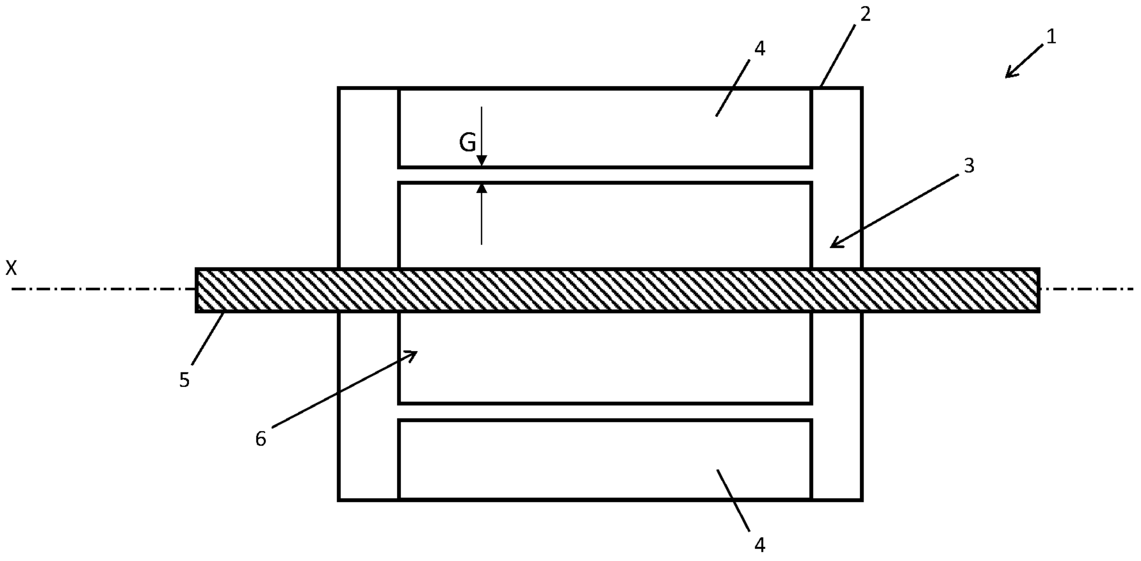
FIG. 2 shows a longitudinal sectional view of the electric machine shown in FIG. 1.
Figure 3:
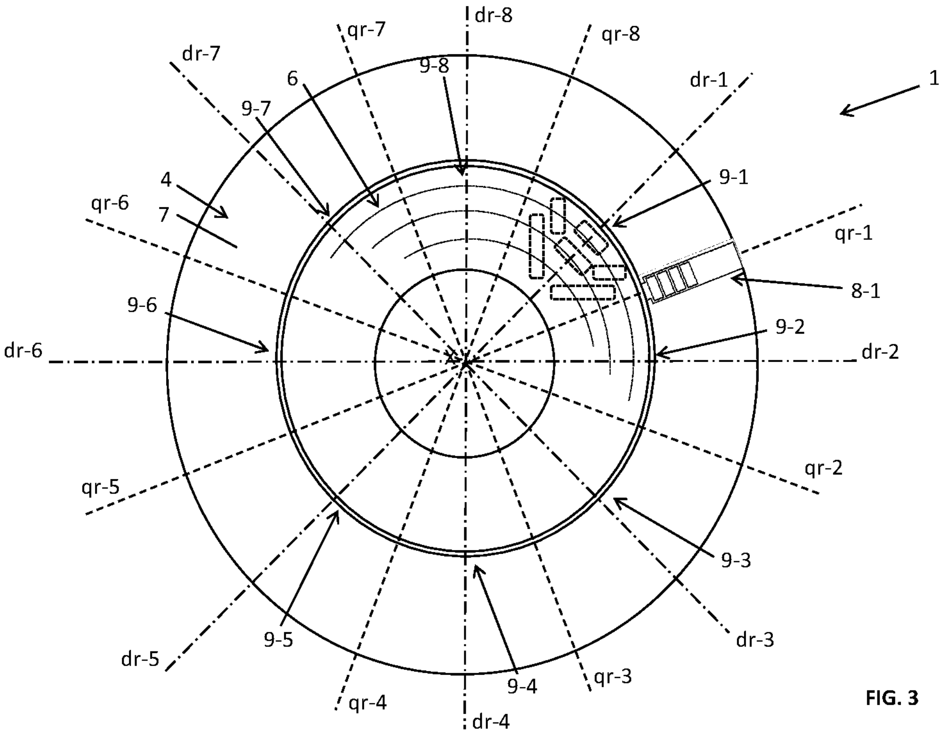
FIG. 3 shows a transverse sectional view of the rotor and stator of the electric machine shown in FIG. 1.
Figure 4:
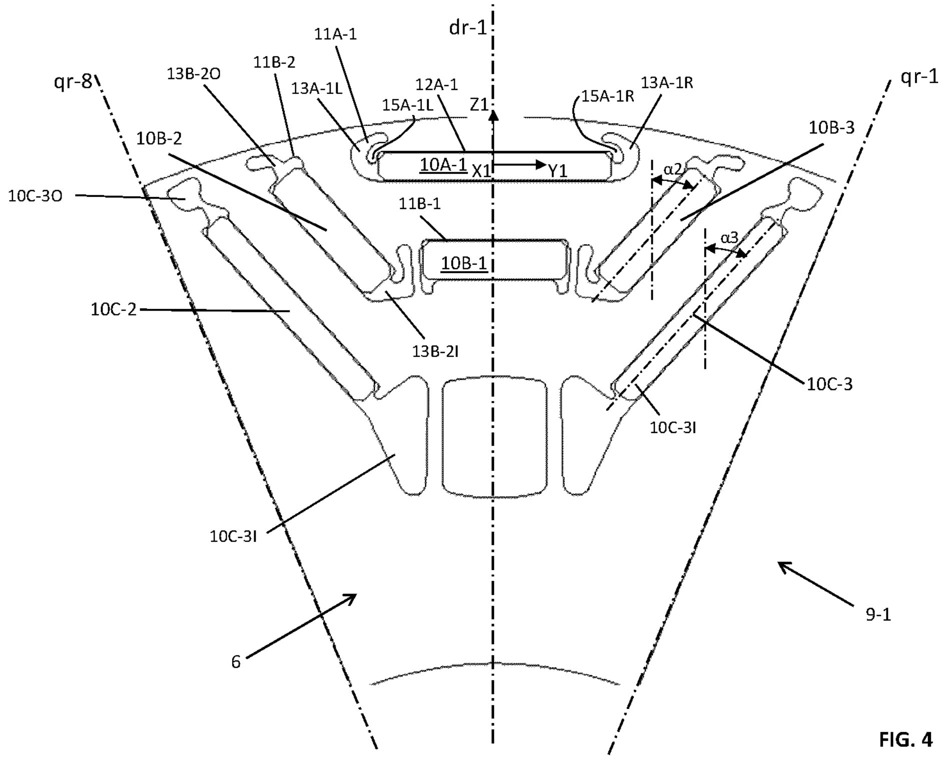
FIG. 4 shows a transverse sectional view of a first rotor pole according to an embodiment of the present invention.

As shown in FIG. 2, the electrical machine 1 comprises a housing 2, a rotor assembly 3, a stator assembly 4 and a drive shaft 5. The electrical machine 1 is described herein with reference to a longitudinal axis X about which the drive shaft 5 rotates. The rotor assembly 3 comprises a rotor (core) 6 which is mounted to the drive shaft 5 (shown in FIG. 3). The stator assembly 4 comprises a stator core 7 composed of a plurality of laminations of a ferromagnetic material. The rotor core 6 is fixedly mounted to the drive shaft 5 such that the rotor core 6 and the drive shaft 5 rotate together. The rotor core 6 is made up of a plurality of laminations of a ferromagnetic material to form a rotor iron. The rotor core 6 may be approximated as a right cylinder co-axial with the longitudinal axis X and having an effective rotor radius r0. The rotor core 6 has an outer surface 8 which is spaced apart from the stator core 7 to form an air gap G. As shown in FIG. 3, the stator 4 comprises a cylindrical stator core 7. The stator core 7 is composed of a plurality of laminations of a ferromagnetic material. The stator core 7 comprises a plurality of teeth 8-*n* projecting radially inwardly.

The electrical machine 1 in the present embodiment is a permanent magnet synchronous motor. As shown in FIG. 3, the rotor core 6 comprises a plurality of rotor poles 9-*n* (the suffix n identifying a pole number). The rotor core 6 in the present embodiment comprises eight (8) rotor poles 9-*n*. The rotor poles 9-*n* each have a direct axis dr-n and a quadrature axis qr-n. The direct axis dr-n corresponds to a central radial axis of each rotor pole 9-*n*. The rotor poles 9-*n* have an equal angular spacing (i.e. a pitch) between the direct axes dr-n of adjacent rotor poles 9-*n*. The angular pitch of the rotor poles 9-*n* in the present embodiment is 45° (360°/8).

The rotor poles 9-*n* each comprise a plurality of permanent magnets (denoted generally by the reference numeral 10) mounted in respective apertures 11 formed in the rotor core 6. The apertures 11 each comprise a chamber 12 for receiving at least one of the permanent magnets 10; and at least one flux barrier 13 for controlling magnetic flux in the rotor core 6. The or each flux barrier 13 has a lower magnetic permeability than the rotor core 6. The or each flux barrier 13 may be hollow or comprise a material having a lower magnetic permeability. In the present embodiment, the flux barriers 13 are formed as extensions of the magnet receiving chambers 12. As described herein, the rotor core 6 also comprises flux guides (denoted generally by the reference numeral 15 herein) for guiding the magnetic flux around the magnets 10 in the event of a demagnetisation event, such as a transient short circuit. During a demagnetization event, the flux guides 15 are operative to guide the magnetic flux around an exterior of the magnets 10 (i.e. to bypass the magnets 10). The portion of the magnetic flux traversing the magnets 10 may be reduced and demagnetization of the magnet 10 may be reduced.

The permanent magnets 10 extend lengthwise through the rotor core 6. Each permanent magnet 10 is described herein with reference to a local coordinate frame comprising a longitudinal axis X1, a transverse axis Y1 and a vertical axis Z1 (defined herein with reference to a centre of the permanent magnets 10). The longitudinal axis X1 of each permanent magnet 10 extends parallel to the longitudinal axis X of the rotor core 6 (i.e. out of the page in the arrangement shown in FIG. 3). The permanent magnets 10 are substantially rectangular in transverse cross-section and have a uniform profile along the transverse axis Y1. Unless indicated to the contrary, the description herein of the position and orientation of the permanent magnets 10 is within the transverse cross-section of the rotor core 6 (i.e. in a plane perpendicular to the longitudinal axis X). The orientation of the permanent magnets 10 is described herein with reference to the orientation of the transverse axis Y1 and the vertical axis Z1.

The permanent magnets 10 are arranged in the rotor core 6 in a plurality of layers (referred to herein as the magnet layers). The magnet layers are radially offset from each other in order to form channels between the permanent magnets 10 for guiding the magnetic flux in the rotor core 6. One or more of the permanent magnets 10 is disposed in each magnet layer. In the present embodiment, the permanent magnets 10 are arranged in three (3) magnet layers which are spaced apart from each other in a radial direction. In particular, the core 6 comprises a first magnet layer A disposed in an outer radial position; a second magnet layer B disposed in an intermediate radial position; and a third magnet layer C disposed in an inner radial position. The or each permanent magnet 10 disposed in the first magnet layer A is referred to herein as a first magnet 10A-n; the or each permanent magnet 10 disposed in the second magnet layer B is referred to herein as a second magnet 10B-n; and the or each permanent magnet 10 disposed in the third magnet layer C is referred to herein as a third magnet 10C-n. (The suffix "n" is used herein to denote particular magnets 10 in each of the first, second and third layers A, B, C.) The same nomenclature is applied herein to identify the apertures 11 and the flux guides 15 formed in the rotor core 6.

The configuration of the permanent magnets 10 is the same in each of the rotor poles 9-*n*. Furthermore, the rotor poles 9-*n* are each symmetrical about their respective direct axes dr-n. For the sake of brevity, a first one of the rotor poles 9-1 will now be described with reference to FIGS. 4 to 8. It will be understood that the other rotor poles 9-*n* in the rotor assembly 3 have substantially the same configuration.

The first magnet layer A in the first rotor pole 9-1 comprises a central first magnet 10A-1 disposed in a central first aperture 11A-1 formed in a central region of the first rotor pole 9-1. The central first magnet 10A-1 extends in a transverse direction (relative to the direct axis dr-n). The central first magnet 10A-1 is rectangular in cross-section. The transverse axis Y1 of the central first magnet 10A-1 extends substantially perpendicular to the direct axis dr-n. The first aperture 11A-1 comprises a first chamber 12A-1, a first flux barrier 13A-1L and a second flux barrier 13A-1R. The central first magnet 10A-1 is mounted in the first chamber 12A-1. The first flux barrier 13A-1L is formed on a first side of the central first aperture 11A-1; and the second flux barrier 13A-1R is formed on a second side of the central first aperture 11A-1. First and second flux guides 15A-1L, 15A-1R are associated with the first and second first flux barriers 13A-1L, 13A-1R respectively. During assembly, the central first magnet 10A-1 is introduced into the first magnet chamber 12A-1 in a longitudinal direction. The first aperture 11A-1 is symmetrical about the direct axis dr. The first flux barrier 13A-1L and the first flux guide 15A-1L are described herein. It will be understood that the second flux barrier 13A-1R and the second flux guide 15A-1R have the same configuration.

Figure 5:
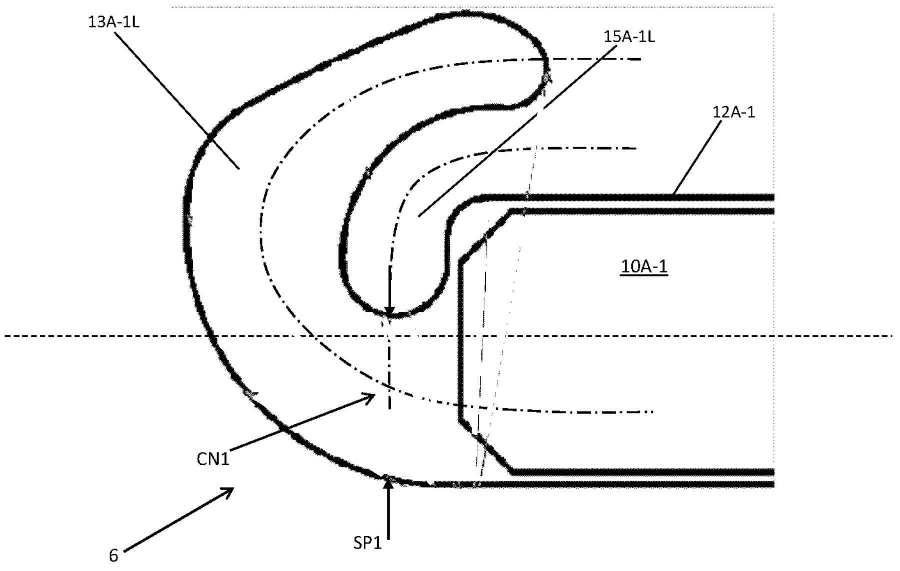
FIG. 5 shows an enlarged view of a flux guide associated with a central magnet provided in the first rotor pole shown in FIG. 4.

As shown in FIG. 5, the first flux guide 15A-1L is an extension of the rotor core 6 and extends partway across the first aperture 11A-1. In particular, the first flux guide 15A-1L extends partway across a passageway in the first aperture 11A-1 connecting the first magnet chamber 12A-1 and the first flux barrier 13A-1L. The first flux guide 15A-1L forms a localized constriction (narrowing) in the passageway formed in the first aperture 11A-1 connecting the first magnet chamber 12A-1 and the first flux barrier 13A-1L. The constriction is designated generally by the reference CN1 herein. The extent of the first flux guide 15A-1L is approximately 40% of the height of the first magnet chamber 12A-1 (in a direction perpendicular to the central transverse axis of the first magnet chamber 12A-1). In the present embodiment, the first flux guide 15A-1L also limits or prevents movement of the central first magnet 10A-1. In a variant, a separate locating member (not shown) may be formed in the rotor core 6 to secure the central first magnet 10A-1.

As shown in FIG. 5, the first flux guide 15A-1L is in the form of a curved elongated member (forming a horn or a finger) configured to extend around a radially outer corner of the central first magnet 10A-1. The first flux guide 15A-1L comprises a central axis having a curved profile. In the present embodiment, the central axis extends through approximately 90°. An inner surface of the first flux guide 15A-1L is configured to cooperate with an end wall of the central first magnet 10A-1; and an opposing outer surface is open to an interior of the first flux barrier 13A-1L. The first flux barrier 13A-1L extends around the outside of the first flux guide 15A-1L. The flux barrier 13A-1L in the present embodiment is part-annular in shape, being generally C-shaped. The angular extent of the flux barrier 13A-1L is approximately 180° in the present embodiment. The flux barrier 13A-1L curves upwardly towards the circumference of the rotor core 6.

The first and second flux guides 15A-1L, 15A-1R may be operative to divert the armature reaction field away from the central first magnet 10-A1, for example to reduce or prevent demagnetisation.

Figure 6:
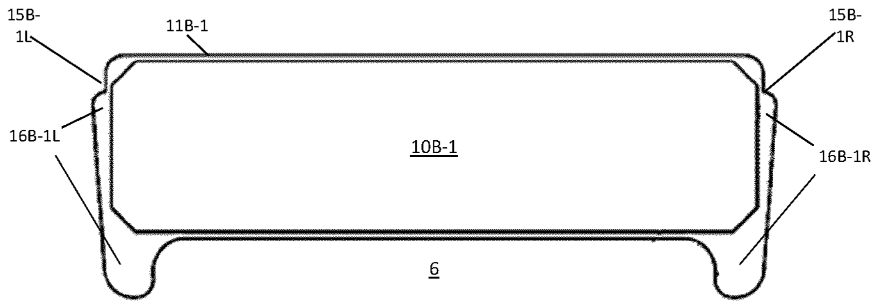
FIG. 6 shows an enlarged vies of a central magnet disposed in a second layer of the first rotor pole shown in FIG. 4.
Figure 7:
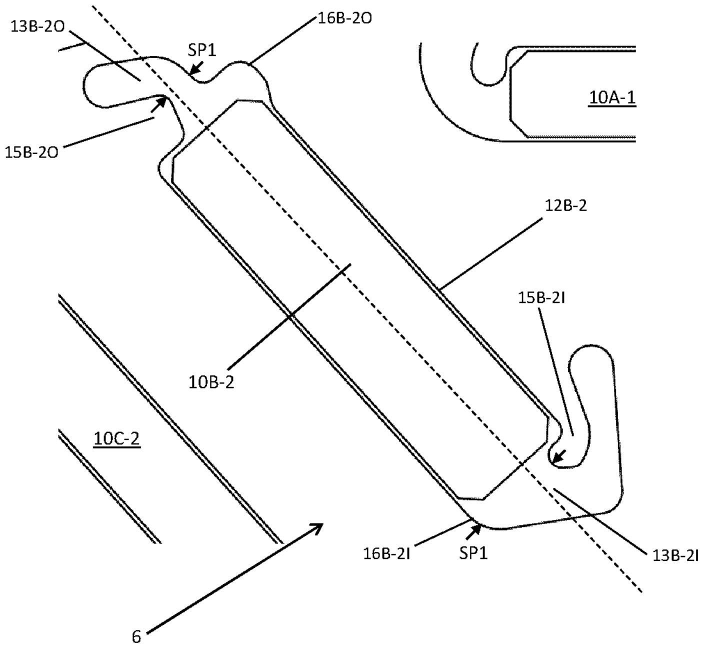
FIG. 7 shows an enlarged view of an aperture for mounting a magnet in a second layer in the first rotor pole shown in FIG. 4.
Figure 8:
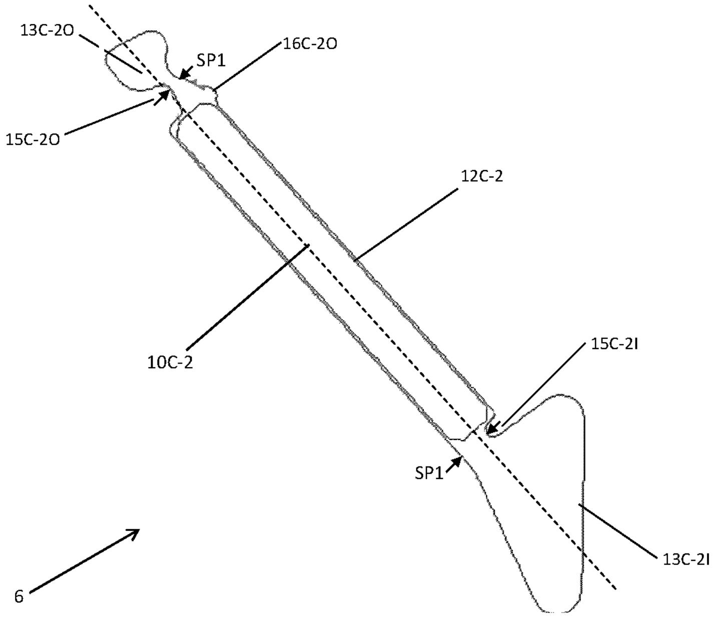
FIG. 8 shows an enlarged view of an aperture for mounting a magnet in a third layer in the first rotor pole shown in FIG. 4.

The second magnet layer B in the first rotor pole 9-1 comprises a plurality of second magnets 10B-n. The second magnet layer B comprises a central second magnet 10B-1 and a pair of inclined second magnets 10B-2, 10B-3. The inclined second magnets 10B-2, 10B-3 are disposed on opposing sides of a central second aperture 11B-1. The central second magnet 10B-1 is mounted in a central second aperture 11B-1. The central second magnet 10B-1 is configured such that the transverse axis Y1 extends substantially perpendicular to the direct axis dr-n. The central second aperture 11B-1 is configured such that the reluctance to the armature reaction flux will be higher via the edges of the central second magnet 10B-1 than through the flux channels formed between the central second aperture 11B-1 and the inclined second magnets 10B-2, 10B-3 disposed on each side thereof. As shown in FIG. 6, first and second flux guides 15B-1L, 15B-1R are formed on opposing sides of the central second aperture 11B-1. The first and second flux guides 15B-1L, 15B-1R comprise projections configured to make a point contact (in a transverse section) with each side of the central second magnet 10B-1. First and second aperture expansions 16B-1L, 16B-1R are formed adjacent to the first and second flux guides 15B-1L, 15B-1R and/or adjacent to the radially inner corners of the central second magnet 10B-1. In a variant, the central second magnet 10B-1 could be omitted (as shown in the further embodiment shown in FIG. 9).

The inclined second magnets 10B-2, 10B-3 are mounted in respective second apertures 11B-2, 11B-3. The configuration of the inclined second magnet 10B-2 and the second aperture 11B-2 disposed on a first side of the direct axis dr-1 will now be described with reference to FIG. 7. It will be understood that the inclined second magnet 10B-3 and the second aperture 11B-3 disposed on the opposing second side of the direct axis dr-1 have the same configuration.

The second aperture 11B-2 comprises a second magnet chamber 12B-2, an inner second flux barrier 13B-2I and an outer second flux barrier 13B-20 (the relative position of the flux barriers being defined with reference to the direct axis dr-n). The second magnet chamber 12B-2 comprises a rectangular region for receiving the inclined second magnet 10B-2. During assembly, the inclined second magnet 10B-2 is introduced into the second magnet chamber 12B-2 in a longitudinal direction. The inclined second magnet 10B-2 is mounted in the second magnet chamber 12B-2. The inclined second magnet 10B-2 is oriented at an acute angle relative to the direct axis dr-n. In particular, the transverse axis Y1 of the inclined second magnet 10B-2 extends at a second acute angle $\alpha 2$ relative to the direct axis dr-n. The second acute angle $\alpha 2$ in the present embodiment is approximately 42°. The inner second flux barrier 13B-2I is disposed proximal to the central second aperture 11B-1; and the outer second flux barrier 13B-20 is disposed proximal to the circumference of the rotor core 6.

Opposing ends of the second magnet chamber 12B-2 are open to the inner and outer second flux barriers 13B-2I, 13B-20. Thus, the inner and outer second flux barriers 13B-2I, 13B-20 are formed integrally with the second magnet chamber 12B-2. The outer second flux barrier 13B-20 comprises an enlarged head portion extending in a circumferential direction (towards the quadrature axis). The inner second flux barrier 13B-2I comprises an enlarged head portion extending in a radial direction (outwardly towards the circumference of the rotor core 6). The rotor core 6 comprises an inner second flux guide 15B-2I and an outer second flux guide 15B-20. The inner second flux guide 15B-2I is associated with the inner second flux barrier 13B-2I; and the outer second flux guide 15B-20 is associated with the outer second flux barrier 13B-20. The configuration of the inner second flux guide 15B-2I and the outer second flux guide 15B-20 will now be described in more detail.

The inner second flux guide 15B-2I is an extension of the rotor core 6 and extends partway across the second aperture 11B-2. In particular, the inner second flux guide 15B-2I extends partway across a passageway in the second aperture 11B-2 connecting the second magnet chamber 12B-2 and the inner second flux barrier 13B-2I. The inner second flux guide 15B-2I is formed on a side of the second aperture 11B-2 proximal to the direct axis dr (i.e. distal from the quadrature axis qr). The inner second flux guide 15B-2I forms a localized constriction CN1 in the passageway formed in the second aperture 11B-2 linking the second magnet chamber 12B-2 and the inner second flux barrier 13B-2I. The extent of the inner second flux guide 15B-2I is approximately 25% of the height of the second magnet chamber 12B-2 (in a direction perpendicular to the central transverse axis of the second magnet chamber 12B-2). In the present embodiment, the inner second flux guide 15B-2I limits or prevents movement of the inclined second magnet 10B-2. In a variant, a separate locating member (not shown) may be formed in the rotor core 6.

A localized region of the second aperture 11B-2 is profiled to form an aperture expansion 16B-2I suitable for controlling the magnetic flux in the rotor core 6 during a demagnetization event. The aperture expansion 16B-2I and the inner second flux guide 15B-2I oppose each other. In the present embodiment, the aperture expansion 16B-2I is formed opposite the inner second flux guide 15B-2I in a direction substantially perpendicular to the transverse axis Y1 of the second aperture 11B-2. The aperture expansion 16B-2I comprises a concave region of the rotor core 6; and the inner second flux guide 15B-2I comprises a convex region of the rotor core 6. The aperture expansion 16B-2I is formed proximate to a corner of the inclined second magnet 10B-2. In the present embodiment the aperture expansion 16B-2I extends away from the transverse axis Y1 beyond the associated face of the inclined second magnet 10B-2. The aperture expansion 16B-2I increases an effective span SP1 of the second aperture 11B-2 in the region proximal to the end of the inclined second magnet 10B-2. This may help to reduce magnetic flux traversing the inclined second magnet 10B-2, thereby reducing or preventing demagnetization of the inclined second magnet 10B-2.

The outer second flux guide 15B-20 is an extension of the rotor core 6 and extends partway across the second aperture 11B-2. In particular, the outer second flux guide 15B-20 extends partway across a passageway in the second aperture 11B-2 connecting the second magnet chamber 12B-2 and the outer second flux barrier 13B-20. The outer second flux guide 15B-20 is formed on a side of the second aperture 11B-2 towards the quadrature axis qr (i.e. further from the direct axis dr). The outer second flux guide 15B-20 forms a localized constriction CN1 in the passageway formed in the second aperture 11B-2 linking the second magnet chamber 12B-2 and the outer second flux barrier 13B-20. The extent of the outer second flux guide 15B-20 is approximately 50% of the height of the second magnet chamber 12B-2 (in a direction perpendicular to the central transverse axis of the second magnet chamber 12B-2). In the present embodiment, the outer second flux guide 15B-20 limits or prevents movement of the inclined second magnet 10B-2. In a variant, a separate locating member (not shown) may be formed in the rotor core 6.

A localized region of the second aperture 11B-2 is profiled to form an aperture expansion 16B-20 suitable for controlling the magnetic flux in the rotor core 6 during a demagnetization event. The aperture expansion 16B-20 and the outer second flux guide 15B-20 oppose each other. In the present embodiment, the aperture expansion 16B-20 is formed opposite the outer second flux guide 15B-20 in a direction substantially perpendicular to the transverse axis Y1 of the second aperture 11B-2. The aperture expansion 16B-20 comprises a concave region of the rotor core 6; and the outer second flux guide 15B-20 comprises a convex region of the rotor core 6. The aperture expansion 16B-20 is formed proximate to a corner of the inclined second magnet 10B-2. In the present embodiment the aperture expansion 16B-20 extends away from the transverse axis Y1 beyond the associated face of the inclined second magnet 10B-2. The aperture expansion 16B-20 increases the effective span of the second aperture 11B-2 in the region proximal to the end of the inclined second magnet 10B-2. This may help to reduce magnetic flux traversing the inclined second magnet 10B-2, thereby reducing or preventing demagnetization of the inclined second magnet 10B-2.

The inner and outer second flux guides 15B-2I, 15B-20 may be operative to divert the armature reaction field away from the inclined second magnet 10-B2, for example to reduce or prevent demagnetisation. Alternatively, or in addition, the aperture expansions 16B-2I, 16B-20 may be operative to divert the armature reaction field away from the inclined second magnet 10-B2. Again, this may reduce or prevent demagnetisation.

The third magnet layer C in the first rotor pole 9-1 comprises a plurality of third magnets 10C-n. The third magnet layer C comprises a pair of inclined third magnets 10C-2, 10C-3. The inclined third magnets 10C-2, 10C-3 are disposed on opposing sides of a central third aperture 11C-1. A central magnet 10 could optionally be mounted in the central third aperture 11C-1, but the central third aperture 11C-1 is hollow (un-filled) in the present embodiment. The inclined third magnets 10C-2, 10C-3 are mounted in respective third apertures 11C-2, 11C-3. The configuration of the inclined third magnet 10C-2 and the third aperture 11C-2 disposed on a first side of the direct axis dr-1 will now be described. It will be understood that the inclined third magnet 10C-3 and the third aperture 11C-3 disposed on a second side of the direct axis dr-1 have the same configuration.

The third aperture 11C-2 comprises a third magnet chamber 12C-2, an inner third flux barrier 13C-2I and an outer third flux barrier 13C-20 (the relative position of the flux barriers being defined with reference to the direct axis dr-n). The third magnet chamber 12C-2 comprises a rectangular region for receiving the inclined third magnet 10C-2. During assembly, the inclined third magnet 10C-2 is introduced into the third magnet chamber 12C-2 in a longitudinal direction. The inclined third magnet 10C-2 is mounted in the third magnet chamber 12C-2. The inclined third magnet 10C-2 is oriented at an acute angle relative to the direct axis dr-n. In particular, the transverse axis Y1 of the inclined third magnet 10C-2 extends at a third acute angle α2 relative to the direct axis dr-n. The third acute angle α2 in the present embodiment is approximately 42°. The inner third flux barrier 13C-2I is disposed proximal to the central third aperture 11C-1; and the outer third flux barrier 13C-20 is disposed proximal to the circumference of the rotor core 6.

Opposing ends of the third magnet chamber 12C-2 are open to the inner and outer third flux barriers 13C-2I, 13C-20. Thus, the inner and outer third flux barriers 13C-2I, 13C-20 are formed integrally with the third magnet chamber 12C-2. The outer third flux barrier 13C-20 comprises an enlarged head portion extending radially outwardly (towards the circumference of the rotor section 6). The inner third flux barrier 13C-2I comprises an enlarged head portion extending in a radial direction (inwardly towards a centre of the rotor core 6). The rotor core 6 comprises an inner third flux guide 15C-2I and an outer third flux guide 15C-20. The inner third flux guide 15C-2I is associated with the inner third flux barrier 13C-2I; and the outer third flux guide 15C-20 is associated with the outer third flux barrier 13C-20. The configuration of the inner third flux guide 15C-2I and the outer third flux guide 15C-20 will now be described in more detail.

The inner third flux guide 15C-2I is an extension of the rotor core 6 and extends partway across the third aperture 11C-2. In particular, the inner third flux guide 15C-2I extends partway across a passageway in the third aperture 11C-2 connecting the third magnet chamber 12C-2 and the inner third flux barrier 13C-2I. The inner third flux guide 15C-2I is formed on a side of the third aperture 11C-2 towards the direct axis dr (i.e. further from the quadrature axis qr). The inner third flux guide 15C-2I forms a localized constriction CN1 in the passageway formed in the third aperture 11C-2 linking the third magnet chamber 12C-2 and the inner third flux barrier 13C-2I. The extent of the inner third flux guide 15C-2I is approximately 45% of the height of the third magnet chamber 12C-2 (in a direction perpendicular to the central transverse axis of the third magnet chamber 12C-2). In the present embodiment, the inner third flux guide 15C-2I limits or prevents movement of the inclined third magnet 10C-2. In a variant, a separate locating member (not shown) may be formed in the rotor core 6.

The outer third flux guide 15C-20 is an extension of the rotor core 6 and extends partway across the third aperture 11C-2. In particular, the outer third flux guide 15C-20 extends partway across a passageway in the third aperture 11C-2 connecting the third magnet chamber 12C-2 and the outer third flux barrier 13C-20. The outer third flux guide 15C-20 is formed on a side of the third aperture 11C-2 towards the quadrature axis qr (i.e. distal form the direct axis dr). The outer third flux guide 15C-20 forms a localized constriction CN1 in the passageway formed in the third aperture 11C-2 linking the third magnet chamber 12C-2 and the outer third flux barrier 13C-20. The extent of the outer third flux guide 15C-20 is approximately 50% of the height of the third magnet chamber 12C-2 (in a direction perpendicular to the central transverse axis of the third magnet chamber 12C-2). In the present embodiment, the outer third flux guide 15C-20 limits or prevents movement of the inclined third magnet 10C-2. In a variant, a separate locating member (not shown) may be formed in the rotor core 6.

A localized region of the third aperture 11C-2 is profiled to form an aperture expansion 16C-20 suitable for controlling the magnetic flux in the rotor core 6 during a demagnetization event. The aperture expansion 16C-20 and the outer third flux guide 15C-20 oppose each other. In the present embodiment, the aperture expansion 16C-20 is formed opposite the outer third flux guide 15C-20 in a direction substantially perpendicular to the transverse axis Y1 of the third aperture 11C-2. The aperture expansion 16C-20 comprises a concave region of the rotor core 6; and the outer second flux guide 15C-20 comprises a convex region of the rotor core 6. The aperture expansion 16C-20 is formed proximate to a corner of the inclined third magnet 10C-2. In the present embodiment the aperture expansion 16C-20 extends away from the transverse axis Y1 beyond the associated face of the inclined third magnet 10C-2. The aperture expansion 16C-20 increases the effective span of the third aperture 11C-2 in the region proximal to the end of the inclined third magnet 10C-2. This may help to reduce magnetic flux traversing the inclined third magnet 10C-2, thereby reducing or preventing demagnetization of the inclined third magnet 10C-2.

The inner and outer third flux guides 15C-2I, 15C-20 may be operative to divert the armature reaction field away from the inclined third magnet 10-C2, for example to reduce or prevent demagnetisation. Alternatively, or in addition, the aperture expansions 16C-2I, 16C-20 may be operative to divert the armature reaction field away from the inclined third magnet 10-C2. Again, this may reduce or prevent demagnetisation.

Figure 9:
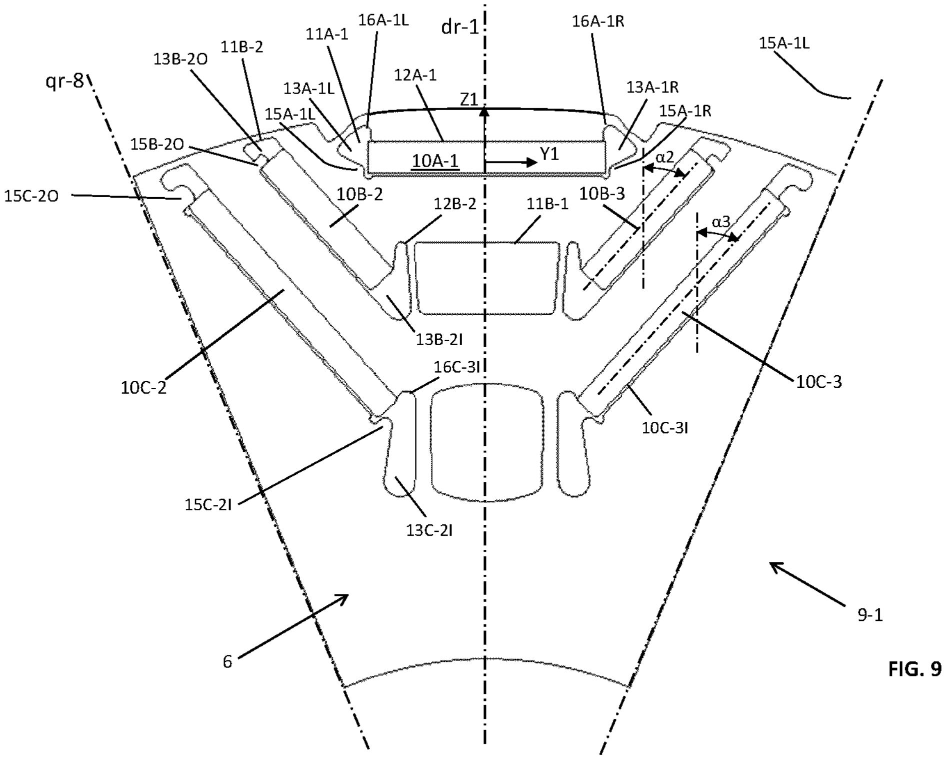
FIG. 9 shows a transverse sectional view of a first rotor pole according to a further embodiment of the present invention.

A rotor assembly 3 in accordance with a further embodiment of the present invention is shown in FIG. 9. Like reference numerals are used for like components. The description herein focuses on those aspects of the rotor assembly 3 which are different from the previous embodiment.

The first magnet layer A in the first rotor pole 9-1 comprises a central first magnet 10A-1 disposed in a central first aperture 11A-1 formed in a central region of the first rotor pole 9-1. The central first magnet 10A-1 extends in a transverse direction (relative to the direct axis dr-n). The central first magnet 10A-1 is rectangular in cross-section and receives the central first magnet 10A-1. The first flux barrier 13A-1L is formed on a first side of the central first aperture 11A-1; and the second flux barrier 13A-1R is formed on a second side of the central first aperture 11A-1. First and second flux guides 15A-1L, 15A-1R are associated with the first and second first flux barriers 13A-1L, 13A-1R respectively. The first aperture 11A-1 is symmetrical about the direct axis dr. The first flux barrier 13A-1L and the first flux guide 15A-1L are described herein. It will be understood that the second flux barrier 13A-1R and the second flux guide 15A-1R have the same configuration.

The first flux guide 15A-1L is an extension of the rotor core 6 and extends partway across the first aperture 11A-1. The extent of the first flux guide 15A-1L is approximately 20% of the height of the first magnet chamber 12A-1 (in a direction perpendicular to the central transverse axis of the first magnet chamber 12A-1). A localized region of the first aperture 11A-1 is profiled to form an aperture expansion 16A-1L suitable for controlling the magnetic flux in the rotor core 6 during a demagnetization event. The aperture expansion 16A-1L and the first flux guide 15A-1L oppose each other. In the present embodiment, the aperture expansion 16A-1L is formed opposite the first flux guide 15A-1L in a direction substantially perpendicular to the transverse axis Y1 of the first aperture 11A-1. The aperture expansions 16A-1L each comprise a concave region of the rotor core 6; and the first flux guides 15A-1L, 15A-1R each comprise a convex region of the rotor core 6. The aperture expansion 16A-1L is formed proximate to a corner of the central first magnet 10A-1. In the present embodiment the aperture expansion 16A-10 extends away from the transverse axis Y1 beyond the associated face of the central first magnet 10A-1. The aperture expansion 16A-10 increases the effective span of the first aperture 11A-1 in the region proximal to the end of the central first magnet 10A-1. This may help to reduce magnetic flux traversing the central first magnet 10A-1, thereby reducing or preventing demagnetization of the central first magnet 10A-1.

The first and second flux guides 15A-1L, 15A-1R may be operative to divert the armature reaction field away from the central first magnet 10-A1, for example to reduce or prevent demagnetisation. Alternatively, or in addition, the aperture expansions 16A-1L, 16A-1R may be operative to divert the armature reaction field away from the central first magnet 10-A1. Again, this may reduce or prevent demagnetisation.

The second magnet layer B in the first rotor pole 9-1 comprises a plurality of second magnets 10B-n. The second magnet layer B comprises a pair of inclined second magnets 10B-2, 10B-3. The inclined second magnets 10B-2, 10B-3 are disposed on opposing sides of a central second aperture 11B-1. The inclined second magnets 10B-2, 10B-3 are mounted in respective second apertures 11B-2, 11B-3. The configuration of the inclined second magnet 10B-2 and the second aperture 11B-2 disposed on a first side of the direct axis dr-1 will now be described with reference to FIG. 7. It will be understood that the inclined second magnet 10B-3 and the second aperture 11B-3 disposed on the opposing second side of the direct axis dr-1 have the same configuration.

The second aperture 11B-2 comprises a second magnet chamber 12B-2, an inner second flux barrier 13B-2I and an outer second flux barrier 13B-20 (the relative position of the flux barriers being defined with reference to the direct axis dr-n). The second magnet chamber 12B-2 comprises a rectangular region for receiving the inclined second magnet 10B-2. The transverse axis Y1 of the inclined second magnet 10B-2 extends at a second acute angle α2 relative to the direct axis dr-n. The second acute angle α2 in the present embodiment is approximately 42°. The inner second flux barrier 13B-2I is disposed proximal to the central second aperture 11B-1; and the outer second flux barrier 13B-20 is disposed proximal to the circumference of the rotor core 6.

Opposing ends of the second magnet chamber 12B-2 are open to the inner and outer second flux barriers 13B-2I, 13B-20. The outer second flux barrier 13B-20 comprises an enlarged head portion extending in a circumferential direction (towards the quadrature axis). The inner second flux barrier 13B-2I comprises an enlarged head portion extending in a radial direction (outwardly towards the circumference of the rotor core 6). The rotor core 6 comprises an outer second flux guide 15B-20 associated with the outer second flux barrier 13B-20. The configuration of the outer second flux guide 15B-20 will now be described in more detail.

The outer second flux guide 15B-20 is an extension of the rotor core 6 and extends partway across the second aperture 11B-2. In particular, the outer second flux guide 15B-20 extends partway across a passageway in the second aperture 11B-2 connecting the second magnet chamber 12B-2 and the outer second flux barrier 13B-20. The outer second flux guide 15B-20 is formed on a side of the second aperture 11B-2 towards the quadrature axis qr (i.e. further from the direct axis dr). The outer second flux guide 15B-20 forms a localized constriction CN1 in the passageway formed in the second aperture 11B-2 linking the second magnet chamber 12B-2 and the outer second flux barrier 13B-20. The extent of the outer second flux guide 15B-20 is approximately 30% of the height of the second magnet chamber 12B-2 (in a direction perpendicular to the central transverse axis of the second magnet chamber 12B-2). In the present embodiment, the outer second flux guide 15B-20 limits or prevents movement of the inclined second magnet 10B-2. In a variant, a separate locating member (not shown) may be formed in the rotor core 6.

The outer second flux guide 15B-20 may be operative to divert the armature reaction field away from the inclined second magnet 10-B2, for example to reduce or prevent demagnetisation.

The third magnet layer C in the first rotor pole 9-1 comprises a plurality of third magnets 10C-n. The third magnet layer C comprises a pair of inclined third magnets 10C-2, 10C-3. The inclined third magnets 10C-2, 10C-3 are disposed on opposing sides of a central third aperture 11C-1. A central magnet 10 could optionally be mounted in the central third aperture 11C-1, but the central third aperture 11C-1 is hollow (un-filled) in the present embodiment. The inclined third magnets 10C-2, 10C-3 are mounted in respective third apertures 11C-2, 11C-3. The configuration of the inclined third magnet 10C-2 and the third aperture 11C-2 disposed on a first side of the direct axis dr-1 will now be described. It will be understood that the inclined third magnet 10C-3 and the third aperture 11C-3 disposed on a second side of the direct axis dr-1 have the same configuration.

The third aperture 11C-2 comprises a third magnet chamber 12C-2, an inner third flux barrier 13C-2I and an outer third flux barrier 13C-20 (the relative position of the flux barriers being defined with reference to the direct axis dr-n). The third magnet chamber 12C-2 comprises a rectangular region for receiving the inclined third magnet 10C-2. The inclined third magnet 10C-2 is mounted in the third magnet chamber 12C-2. The transverse axis Y1 of the inclined third magnet 10C-2 extends at a third acute angle α2 relative to the direct axis dr-n. The third acute angle α2 in the present embodiment is approximately 42°. The inner third flux barrier 13C-2I is disposed proximal to the central third aperture 11C-1; and the outer third flux barrier 13C-20 is disposed proximal to the circumference of the rotor core 6.

Opposing ends of the third magnet chamber 12C-2 are open to the inner and outer third flux barriers 13C-2I, 13C-20. Thus, the inner and outer third flux barriers 13C-2I, 13C-20 are formed integrally with the third magnet chamber 12C-2. The outer third flux barrier 13C-20 comprises an enlarged head portion extending radially outwardly (towards the circumference of the rotor section 6). The inner third flux barrier 13C-2I comprises an enlarged head portion extending in a radial direction (inwardly towards a centre of the rotor core 6). The rotor core 6 comprises an inner third flux guide 15C-2I and an outer third flux guide 15C-20. The inner third flux guide 15C-2I is associated with the inner third flux barrier 13C-2I; and the outer third flux guide 15C-20 is associated with the outer third flux barrier 13C-20. The configuration of the inner third flux guide 15C-2I and the outer third flux guide 15C-20 will now be described in more detail.

The inner third flux guide 15C-2I is an extension of the rotor core 6 and extends partway across the third aperture 11C-2. In particular, the inner third flux guide 15C-2I extends partway across a passageway in the third aperture 11C-2 connecting the third magnet chamber 12C-2 and the inner third flux barrier 13C-2I. The inner third flux guide 15C-2I is formed on a side of the third aperture 11C-2 towards the direct axis dr (i.e. further from the quadrature axis qr). The inner third flux guide 15C-2I forms a localized constriction CN1 in the passageway formed in the third aperture 11C-2 linking the third magnet chamber 12C-2 and the inner third flux barrier 13C-2I. The extent of the inner third flux guide 15C-2I is approximately 20% of the height of the third magnet chamber 12C-2 (in a direction perpendicular to the central transverse axis of the third magnet chamber 12C-2). In the present embodiment, the inner third flux guide 15C-2I limits or prevents movement of the inclined third magnet 10C-2. In a variant, a separate locating member (not shown) may be formed in the rotor core 6.

The outer third flux guide 15C-20 is an extension of the rotor core 6 and extends partway across the third aperture 11C-2. In particular, the outer third flux guide 15C-20 extends partway across a passageway in the third aperture 11C-2 connecting the third magnet chamber 12C-2 and the outer third flux barrier 13C-20. The outer third flux guide 15C-20 is formed on a side of the third aperture 11C-2 towards the quadrature axis qr (i.e. distal form the direct axis dr). The outer third flux guide 15C-20 forms a localized constriction CN1 in the passageway formed in the third aperture 11C-2 linking the third magnet chamber 12C-2 and the outer third flux barrier 13C-20. The extent of the outer third flux guide 15C-20 is approximately 45% of the height of the third magnet chamber 12C-2 (in a direction perpendicular to the central transverse axis of the third magnet chamber 12C-2). In the present embodiment, the outer third flux guide 15C-20 limits or prevents movement of the inclined third magnet 10C-2. In a variant, a separate locating member (not shown) may be formed in the rotor core 6.

A localized region of the third aperture 11C-2 is profiled to form an aperture expansion 16C-2I suitable for controlling the magnetic flux in the rotor core 6 during a demagnetization event. The aperture expansion 16C-2I and the inner third flux guide 15C-2I oppose each other. In the present embodiment, the aperture expansion 16C-2I is formed opposite the inner third flux guide 15C-2I in a direction substantially perpendicular to the transverse axis Y1 of the third aperture 11C-2. The aperture expansion 16C-2I comprises a concave region of the rotor core 6; and the outer second flux guide 15C-2I comprises a convex region of the rotor core 6. The aperture expansion 16C-2I is formed proximate to a corner of the inclined third magnet 10C-2. In the present embodiment the aperture expansion 16C-2I extends away from the transverse axis Y1 beyond the associated face of the inclined third magnet 10C-2. The aperture expansion 16C-2I increases the effective span of the third aperture 11C-2 in the region proximal to the end of the inclined third magnet 10C-2. This may help to reduce magnetic flux traversing the inclined third magnet 10C-2, thereby reducing or preventing demagnetization of the inclined third magnet 10C-2.

At least in certain embodiments, the flux guides 15 help to protect the magnets 10 from demagnetization, for example during a fault condition or a transient short-circuit. The flux guides 15 establish one or more path for flux through the rotor core 6. These paths have a lower reluctance than paths traversing or crossing a portion of the magnets 10, for example across a corner of the magnet 10. The flux guides 15 are operative to steer the flux away from those regions of the magnets 10, such as the corners, which are most affected by demagnetisation.

The permanent magnets 10 described herein are each illustrated as having a unitary composition. It will be understood that each permanent magnet 10 may be formed from a plurality of magnets. The permanent magnets 10 may comprise a plurality of segments disposed alongside each other. One or more of the permanent magnets 10 may comprise a segmented magnet.

It will be appreciated that various modifications may be made to the embodiment(s) described herein without departing from the scope of the appended claims.

The invention claimed is:

1. A rotor for an electric machine, the rotor comprising:

a plurality of rotor poles, the rotor poles each comprising a plurality of magnet layers, and wherein a first magnet layer of the plurality of magnet layers comprises:

a first aperture comprising:

a first chamber for receiving a first magnet; and at least one first flux barrier for controlling a path through which magnetic flux flows in the rotor;

wherein the rotor poles each have a direct axis corresponding to a central radial axis of the rotor pole and the first magnet layer each of the rotor poles comprise at least one first flux guide for guiding magnetic flux across the at least one first flux barrier during a demagnetization event, the or each first flux guide forming a constriction between the first chamber and the at least one first flux barrier, and wherein the or each first flux guide is configured such that the constriction has a span which is smallest in a direction substantially perpendicular to a central longitudinal axis of the first chamber and a transverse axis of the first chamber and parallel to a vertical axis of the first chamber, the transverse axis and the vertical axis each perpendicular to the central longitudinal axis, the transverse axis perpendicular to the direct axis, and wherein a first of the at least one first flux barrier is disposed at a first end of the first aperture and a second of the at least one first flux barrier is disposed at a second end of the first aperture, wherein the first chamber extends in a transverse manner from the first end to the second end along the transverse axis, and wherein each of the first and the second of the least one first flux barrier is annular and has a C-shape; and wherein a second magnet layer of the plurality of magnet layers comprises:

a second aperture comprising a second chamber and at least one second flux barrier, the second chamber for receiving a second magnet, the second magnet oriented at an acute angle relative to the direct axis; and at least one second flux guide, wherein the second aperture comprises at least one aperture expansion, the at least one aperture expansion being formed opposite to the at least one second flux guide.

2. The rotor as claimed in claim 1, wherein the or each first flux guide comprises a projection extending partway across the first aperture.

3. The rotor as claimed in claim 1, wherein the or each first flux guide is disposed between the first chamber and the at least one first flux barrier.

4. The rotor as claimed in claim 1, wherein an extent of the or each first flux guide is approximately 40% of a height of the first chamber in a direction perpendicular to the transverse axis of the first chamber and parallel to the vertical axis of the first chamber.

5. The rotor as claimed in claim 1, wherein a first one of the at least one second flux guide is disposed on a first side of the second aperture proximal to a circumference of the rotor and a second one of the at least one second flux guide is disposed on a second side of the second aperture distal from the circumference of the rotor.

6. The rotor as claimed in claim 1, wherein one of the at least one first flux guide is associated with each first flux barrier.

7. The rotor as claimed in claim 1, further comprising, arranged in a third magnet layer of the plurality of magnet layers:

a third aperture comprising a third chamber and at least one third flux barrier, the third chamber for receiving a third magnet, the third magnet oriented at an acute angle relative to the direct axis; and at least one third flux guide.

8. The rotor as claimed in claim 1, wherein the at least one first flux barrier extends towards an outer circumference of the rotor.

9. A rotor for an electric machine, the rotor comprising:

a plurality of rotor poles, the rotor poles each comprising:

a first aperture comprising:

a first chamber for receiving a first magnet; and at least one first flux barrier for controlling magnetic flux in the rotor, wherein the first aperture is arranged in a first magnet layer of a plurality of magnet layers, a second magnet layer of the plurality of magnet layers comprising a pair of inclined second magnets accommodated in respective second apertures, the first aperture positioned intermediate the respective second apertures, wherein each second aperture comprises a second chamber, at least one second flux barrier, and at least one aperture expansion, each aperture expansion being formed opposite to a respective second flux guide of the second magnet layer; and wherein the at least one first flux barrier is annular and has a C-shape, wherein each rotor pole includes a first flux guide for guiding magnetic flux across the at least one first flux barrier during a demagnetization event, the first flux guide forming a constriction between the first chamber and the at least one first flux barrier, and wherein the first flux guide is configured such that the constriction has a span which is smallest in a direction substantially perpendicular to a central longitudinal axis of the first chamber and a transverse axis of the first chamber and parallel to a vertical axis of the first chamber, the transverse axis and the vertical axis each perpendicular to the central longitudinal axis.

10. A vehicle comprising the electric machine comprising the rotor as claimed in claim 1.

11. The rotor as claimed in claim 7, wherein a first one of the at least one third flux guide is disposed on a first side of the third aperture proximal to a circumference of the rotor and a second one of the at least one third flux guide is disposed on a second side of the third aperture distal from the circumference of the rotor.

* * * * *